United States Patent [19]

Harwood et al.

[11] Patent Number: 5,039,413
[45] Date of Patent: Aug. 13, 1991

[54] SPIRAL WRAPPED FLUID TREATMENT ELEMENT

[75] Inventors: Colin F. Harwood, Glen Cove; Peter J. Degen, Huntington; Ronald Spinelli, Jr., Seaford, all of N.Y.

[73] Assignee: Pall Corporation, Glen Cove, N.Y.

[21] Appl. No.: 327,689

[22] Filed: Mar. 23, 1989

Related U.S. Application Data

[63] Continuation-in-part of Ser. No. 176,865, Apr. 1, 1988, Pat. No. 4,882,056.

[51] Int. Cl.⁵ .................. B01D 27/06; B01D 29/07
[52] U.S. Cl. .................. 210/457; 210/491; 210/497.1; 55/498; 55/520; 55/524
[58] Field of Search ............. 210/497.2, 497.1, 457, 210/491, 489; 55/498, 520, 524

[56] References Cited

U.S. PATENT DOCUMENTS

| | | | |
|---|---|---|---|
| 930,401 | 8/1909 | Monteagle | 210/497.1 |
| 1,001,929 | 8/1911 | Collins | 210/497.1 |
| 2,064,511 | 12/1936 | Wells | 210/184 |
| 2,539,450 | 1/1951 | Magill | 93/80 |
| 3,026,610 | 3/1962 | Wakefield | 29/451 |
| 3,061,107 | 10/1962 | Taylor | 210/487 |
| 3,063,888 | 11/1962 | Howard et al. | 210/490 |
| 3,241,680 | 3/1966 | Humbert | 210/457 |
| 3,397,793 | 8/1968 | MacDonnell | 210/491 |
| 3,442,392 | 5/1969 | Skelley | 210/491 |
| 3,578,175 | 5/1971 | Manjikian | 210/489 |
| 3,769,128 | 10/1973 | Majikian | 156/185 |
| 3,804,259 | 4/1974 | Riggleman et al. | 210/490 |
| 3,904,798 | 9/1975 | Vogt et al. | 428/36 |
| 4,065,341 | 12/1977 | Cub | 210/487 |
| 4,101,423 | 7/1978 | Merrill et al. | 210/494.1 |
| 4,214,612 | 7/1980 | de Putter | 138/144 |
| 4,402,830 | 9/1983 | Pall | 210/457 |
| 4,564,376 | 1/1986 | Billiet | 55/486 |
| 4,594,202 | 6/1986 | Pall et al. | 264/8 |
| 4,692,196 | 9/1987 | Ellegood et al. | 156/187 |
| 4,726,901 | 2/1988 | Pall et al. | 210/496 |
| 4,752,396 | 6/1988 | Schmitt | 210/494.1 |
| 4,839,037 | 6/1989 | Bertelsen et al. | 210/97 |
| 4,842,736 | 6/1989 | Bray et al. | 210/321.61 |
| 4,855,058 | 8/1989 | Holland et al. | 210/494.1 |

FOREIGN PATENT DOCUMENTS

| | | |
|---|---|---|
| 547695 | 11/1959 | Belgium . |
| 724242 | 8/1942 | Fed. Rep. of Germany . |
| 2354851 | 11/1973 | Fed. Rep. of Germany . |
| 3513062 | 10/1986 | Fed. Rep. of Germany . |
| 53-2390 | 11/1978 | Japan . |
| 55-34143 | of 1980 | Japan . |
| 55-39279 | of 1980 | Japan . |
| 63-185423 | of 1988 | Japan . |
| 855068 | 3/1957 | United Kingdom . |
| 1337170 | 11/1973 | United Kingdom . |
| 1543404 | 4/1979 | United Kingdom . |
| 1549302 | 7/1979 | United Kingdom . |

Primary Examiner—Robert A. Dawson
Assistant Examiner—Wanda L. Millard
Attorney, Agent, or Firm—Leydig, Voit & Mayer

[57] ABSTRACT

Filter cartridge elements are provided with a spiral wrapping made from a thermoplastic polymer to give stability against inside-out flow and to protect the filtration medium. The spiral wrapping is attached to underlying turns of the wrap and to the surface of the filter cartridge by fusion bonding.

17 Claims, 2 Drawing Sheets

SPIRAL WRAPPED FLUID TREATMENT ELEMENT

This application is a continuation-in-part of U.S. Pat. application Ser. No. 07/176,865 filed Apr. 1, 1988, and patented Nov. 21, 1989 as U.S. Pat. No. 4,882,056, which is incorporated by reference.

TECHNICAL FIELD

The present invention relates to a fluid treatment element. More particularly, the present invention relates to a fluid treatment element which is wound with a wrap.

BACKGROUND ART

The typical fluid treatment element may comprise a hollow, generally cylindrical, permeable cartridge and an end cap positioned on each end of the cartridge to direct a fluid, i.e., a gas or a liquid through the cartridge. Depending on the specific treatment to be given the fluid, the cartridge may, for example, include a filter medium for removing particulates or a demineralizer or sorbent for separating ionic or chemical components.

Frequently, the fluid is forced to flow outwardly from the interior to the exterior of the hollow, permeable cartridge. This "inside-out" flow may be the normal direction of flow through the element, because it may have certain advantages. For example, many filters have a graded porosity with the coarsest pores on the upstream portion of the filter and the finest pores on the downstream portion of the filter. If the normal direction of flow is inside-out, the downstream portion of the cartridge where the pores are finest is the exterior portion of the cartridge where the diameter of the cartridge is greatest. This helps to reduce the pressure drop across the finest porosity portion of the filter.

However, even if the normal direction of flow is "outside-in", the direction of flow may occasionally be reversed. This reversal of the normal outside-in flow may be accidental, e.g., due to a surge in fluid pressure downstream from the element, or it may be intentional, e.g., to flush an accumulated cake of particulate matter from the external surface of the cartridge.

Whenever the fluid flows inside-out through the permeable cartridge, the fluid exerts an outwardly-directed force on the interior of the cartridge. If this force is large enough, the cartridge may distend, distort, rupture, or even burst, thereby reducing the efficiency of the cartridge or even rendering the cartridge totally ineffective. Many high efficiency filter cartridges characterized by low resistance to inside-out flow include a medium of fibers that are not tightly bonded to one another. The force required to distort such a cartridge may be relatively small.

DISCLOSURE OF THE INVENTION

U.S. Pat. application Ser. No. 07/176,865, filed Apr. 1, 1988, describes the provision of a spiral wrap in which the turns are bonded to the filter cartridge itself and also to overlapping turns of the spiral wrap so as to produce a structure having great resistance to the problems outlined above. The application also contains teaching regarding the use of hot melt glues to bring about the adhesion between the succeeding turns of the spiral wrap and the filter cartridge. It is found that the use of hot melt glues is attended by several inconveniences that may make their use less than satisfactory in all circumstances. For example, that some heated resin melts give off smoke when subjected to elevated temperatures. In addition, lines and nozzles carrying the heated resin to the application point may become blocked and resin can tend to drip from the nozzles onto machine parts requiring time-consuming clean-up operations. Furthermore, if resins are changed the system has to be purged of the old resin and this takes time. In addition, it is possible for a resin melt that is held up in dead spots within the delivery equipment to degrade and introduce impurities into the resin flow. Finally, it is found that some hot melt resins may have chemical or solvent resistance that is inappropriate for the application for which they are intended. In accordance with one aspect of the invention, an improved fluid treatment element may comprise a permeable filter medium, a permeable wrap, and an end cap secured to the end of the filter medium and to the wrap. The filter medium has a hollow configuration, an external surface, and an end. The permeable wrap has successive overlapping windings spirally wound around and completely covering the external surface of the filter medium, increasing the hoop strength of the spirally wrapped element sufficiently to withstand a pressure drop of at least 75 psid with less than 10% of the pressure drop being across the permeable wrap. Each winding of the permeable wrap is positively fastened to the filter medium or a previous lapped winding or both.

In accordance with another aspect of the present invention, an improved fluid treatment element may comprise a permeable cartridge and a permeable wrap formed of a thermoplastic polymeric material that softens below its decomposition temperature. The wrap has inner and outer surfaces, an end portion, and first and second edge portions which may, for example, be leading and trailing edge portions. The wrap is spirally wound around and completely covers the external surface of the cartridge with the second edge portion overlapping the outer surface of the wrap and the inner surface of the wrap having a section contiguous with the external surface of the cartridge. In the improved fluid treatment element of the invention, the external surface of the cartridge is positively fastened to the contiguous section of the inner surface of the wrap, and/or the outer surface of the wrap is positively fastened to the overlapping second edge portion of the wrap. The positive fastening referred to above is brought about by fusion of contiguous layers under the influence of a sealing member which is pressed upon a portion of the outer surface of the spiral wrap such that it becomes softened and, upon removal of the sealing member, fuses to the layer directly below at that point. Fusion can be brought about by direct electrical heating or by ultrasonic or infrared energy devices, or other means adapted to produce local fusion temperatures in a short time.

The bonding can occur through the softened polymer flowing into and solidifying in the interstices of the layer below, in which case the lower layer need not itself be softened. Alternatively, and often preferably, both layers are melted by the sealing member such that they fuse together in the vicinity contacted by the sealing member. The improved fluid treatment element further comprises an end cap disposed at the end of the cartridge, the end cap being secured to the end of the cartridge and the end portion of the wrap.

Another aspect of the invention, therefore, provides a process for the production of a spiral wrapped fluid treatment element having a cylindrical external surface, an axial passage, and a filter medium disposed between said external surface and said axial passage which comprises spirally wrapping a plurality of turns of a wrap comprising a permeable thermoplastic polymeric material of a width that is less than the length of the fluid treatment element, around the external surface of the fluid treatment element such that a first edge portion of each turn of the wrap, after the first, overlaps a second edge portion of the immediately preceding turn and, as the turns are applied, subjecting said wrap to a fusion bonding treatment along said first edge portion such that the thermoplastic polymeric material melts and fusion bonds to the surface with which it is in contact.

BEST MODE FOR CARRYING OUT THE INVENTION

Figure 1:
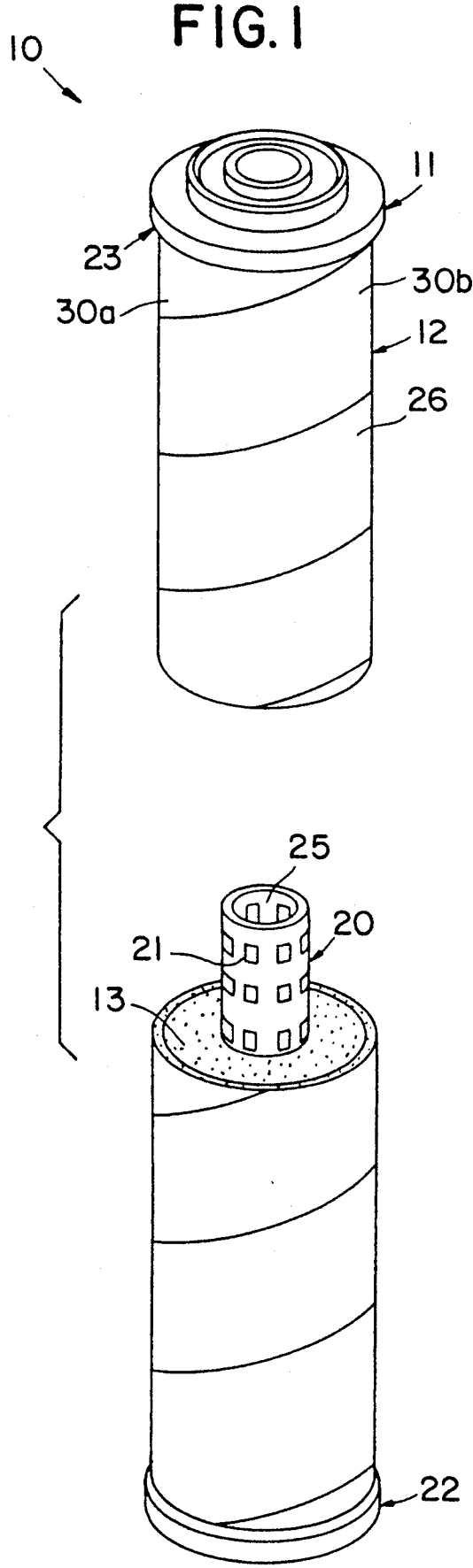
FIG. 1 is an exploded perspective view of a fluid treatment element embodying an aspect of the present invention.
Figure 2:
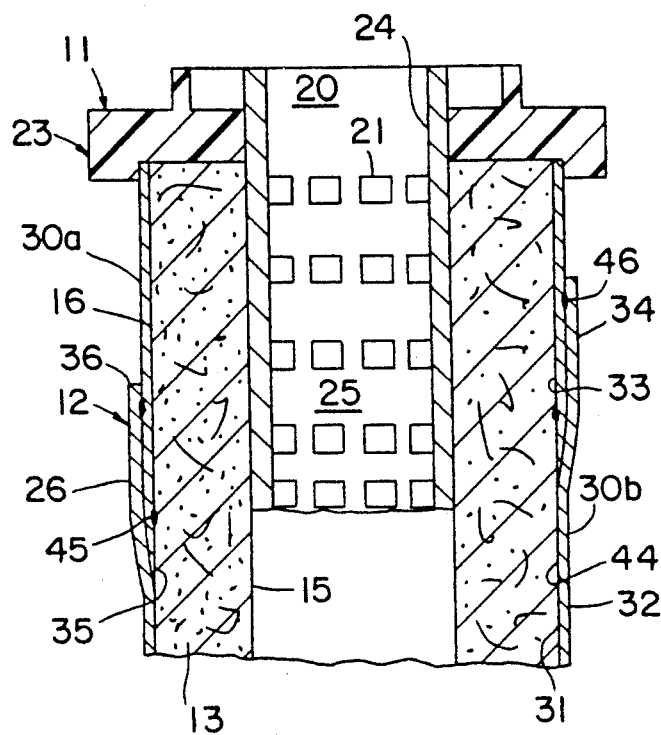
FIG. 2 is a partial sectional view of the fluid treatment element of FIG. 1.
Figure 3:
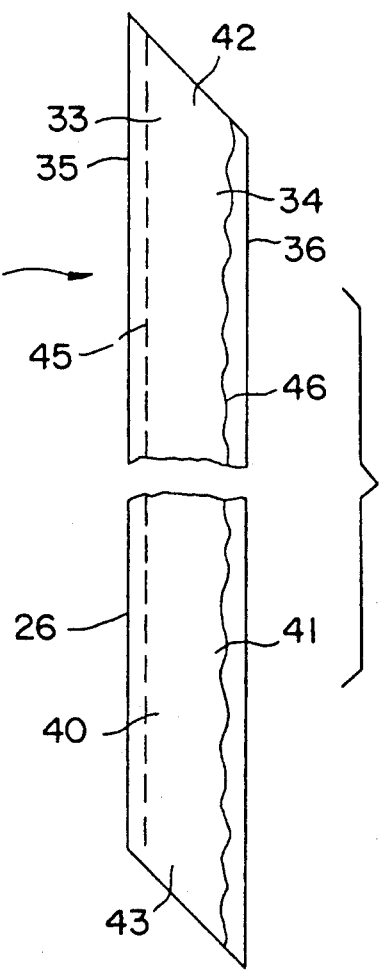
FIG. 3 is a plan view of the wrap of the fluid treatment element of FIG. 1 showing a first heat fusion bonding area disposed intermittently in a straight line and a second bonding area disposed continuously in a curved line.

An exemplary fluid treatment element 10 embodying an aspect of the present invention generally comprises a cartridge 11 and a wrap assembly 12, as shown in FIGS. 1 and 2, made of a heat fusible material. The cartridge 11 provides the primary treatment for fluid flowing through the exemplary element 10 while the wrap assembly 12 provides structural support for the cartridge 11. In particular, the wrap assembly provides additional strength, to resist the various forces exerted on the cartridge 11 by fluids flowing outside-in or inside-out through the exemplary fluid treatment element 10. Additionally, the wrap assembly 12 may provide a pre- or post-treatment of the fluid. At the same time, the wrap assembly should provide as little additional pressure drop as possible. By providing the cartridge 11 with the wrap assembly 12, the exemplary fluid treatment element 10 is surprisingly strong with little sacrifice in efficiency.

The cartridge of the fluid treatment element may be variously configured, depending on the specific treatment to be given the fluid. For example, in the exemplary fluid treatment element 10, the cartridge 11 includes a filter medium 13 for removing particulates from the fluid. Alternatively or additionally, the cartridge may include a demineralizer, such as an ion exchange resin, or a sorbent, such as activated carbon, for separating ionic and other chemical components. In the exemplary fluid treatment element 10, the cartridge 11 has a hollow, generally cylindrical configuration, although it may have any other suitable hollow configuration.

The filter medium 13 of the exemplary fluid treatment element 10 includes an interior surface 15 and an exterior surface 16 and preferably comprises a fibrous mass of non-woven microfibers, such as that available from Pall Corporation under the trademark PROFILE. The microfibers of the PROFILE medium are substantially free of fiber-to-fiber bonding and are secured to each other by mechanical entanglement. The PROFILE medium is a high dirt capacity medium. However, because the fibers are not bonded to one another, the medium lacks sufficient strength to readily resist the outwardly-directed forces exerted on the medium or any significant pressure drop between the inside and the outside of the medium. U.S. Pat. Nos. 4,594,202 and 4,729,901 disclose the PROFILE medium and are incorporated by reference. Alternatively, the cartridge 11 may comprise any other suitable filter medium, multiple layers of a single filter medium, or multiple filter media.

The cartridge 11 of the exemplary fluid treatment element 10 also comprises a tubular core 20 disposed coaxially within and adjacent to the interior surface 15 of the medium 13. The core 20 may be fabricated from any substantially rigid material, for example, a metal or a high strength plastic. Preferably, the core 20 is perforated and thus has holes 21 to allow the fluid to pass therethrough. Alternatively, the core may be fabricated from a substantially rigid, fluid-permeable material, for example, a porous metal composite or a wire mesh structure. The core 20 supports the filter medium 13 against pressurized out-side-in flow and prevents the element from collapsing inwardly.

The cartridge 11 further comprises a blind end cap 22 and an open end cap 23 positioned at the ends of the filter medium 13 and the core 20. The open end cap 23 includes an opening 24 which communicates with a cavity 25 within the hollow cartridge 11. Alternatively, both end caps may be open end caps, allowing several cartridges to be physically connected end-to-end.

The wrap assembly 12 preferably provides additional strength, in particular, hoop strength, to support the cartridge 11 without any substantial sacrifice in pressure drop. For example, for a cartridge 11 comprising the PROFILE medium and having a 2-3 inch outer diameter, the wrap assembly 12 preferably provides sufficient hoop strength to prevent permanent damage to the cartridge 11 during inside-out flow with a 75 psid pressure drop across the fluid treatment element 10. At the same time the pressure drop across the wrap assembly 12 is preferably less than 10 percent and most preferably less than 5 percent of the pressure drop which would exist across the cartridge if there were no wrap assembly 12.

The wrap assembly 12 comprises a permeable wrap material spirally wound about the exterior surface 16 of the cartridge 11 in successive windings or turns 30(a-d). Each winding or turn 30a, 30b, 30c and 30d comprises a 360 degree revolution of the cartridge 11. Preferably, the wrap may comprise a random non-woven fibrous material, for example, a ribbon of open net material, or a regular woven material.

The wrap is made from a thermoplastic polymeric heat fusible material that can be melted without significant decomposition at temperatures that will not result in structural damage or impairment to any other portion of the fluid treatment element beyond a softening of the immediate vicinity of the treated area. To facilitate bonding to the cartridge, the softening point of the material forming the surface of the cartridge should be below the decomposition temperature of the polymer from which the wrap is made. Where the surface of the cartridge is fibrous, local melting of the wrap with penetration of the fibrous surface is adequate to form a bond between the wrap and the cartridge surface.

The wrap may, within the limitations recited above, be fabricated from a variety of materials including polymers, such as polyester, polyamide, polyvinyl chloride, polyacrylonitrile, or polyolefins, such as polyethylene or polypropylene. Alternatively, the material may comprise a woven material such as a metal wire or fiberglass cloth which may be coated with a heat fusible resin such as a polyvinyl chloride sheath. In the exemplary fluid treatment element 10, both the wrap 12 and the filter medium 13 may be fashioned from a polyester, from a polypropylene, or from nylon or from any other suitable polymer. The wrap may typically be two to four inches wide, although precise dimensions may vary from one application to another.

The externally wound wrap 12 has inner and outer surfaces 31, 32 and first and second edge portions 33 and 34, respectively. In winding the wrap 12 onto the filter medium 13, the first edge portion 33 of one winding 30a is overlapped by the second edge portion 34 of the next winding 30b by a predetermined amount, preferably 50 percent of the width of the wrap. By overlapping successive windings 30a, 30b, the wrap becomes self-reinforcing. This has the benefit of additional strength and allows the use of a wrapping material that has a relatively low tensile strength. By providing a 50 percent overlap, the filter medium 13 is wrapped with two thicknesses of the wrap with only one pass through the wrapper. This has the benefit of protecting against non-uniformities in the wrapping material. However, the predetermined amount of overlap may vary in different applications.

In accordance with one aspect of the present invention, each individual winding of the wrap may be fastened by heat fusion to the cartridge, to a previous winding of the wrap, or to both. In the exemplary fluid treatment element 10 as described above in one aspect of the present invention, each individual winding is positively fastened to both the cartridge 11 and the previous winding by heat fusion. In one embodiment, the wrap assembly is bonded along a heat fusion treatment line which fastens the windings to the exterior surface 16 of the cartridge 11 and along a second heat fusion treatment line which positively fastens together successive overlapped windings. In the preferred embodiment, the same type of material may be used for the wrap and the cartridge thus facilitating the fusion process. For example, all may comprise a polyester or a polypropylene.

In a preferred embodiment, a single fusion line is provided by application of a heater element to the wrap so as to bond the contacted part of the wrap to an underlying turn of the wrap and to the cartridge surface beneath it. The fusion lines are preferably in the form of relatively thin strips, thus blocking only a negligible amount of the exemplary fluid treatment element 10 from fluid flow. Accordingly, the original permeability of the wrap, i.e., the permeability of the wrap prior to the fusion treatment, is substantially maintained.

Although the spiral wrap may alternatively be bonded to the filter medium and to itself using an adhesive, the use of the heat fusion process to secure the successive turns of the spiral wrap both to each other and to the filter cartridge is very clean in that it requires no separate polymer melt delivery equipment that may become blocked or that may drip on other surfaces. Fusion bonding also introduces no new components into the mixture, and can be made as strong and/or extensive as may be required. It is, however, preferable where two components are to be fusion bonded together that both be fusible at temperatures which are roughly in the same range.

Fusion may be brought about by application of any suitably shaped member to the surface of the spiral wrap. This may be, for example, a rectangular heated member urged towards the surface of the wrap by some suitable resilient mechanism and provided with means for controlling the temperature of the heated member to that at which fusion bonding will be obtained. Alternatively and often preferably, the member is in the form of a heated wheel which runs along the surface of the wrap in the position at which a fusion line is desired. The width of the fusion line is dictated largely by the dimensions of the fluid treatment member but in general it is unnecessary to provide a fusion line that is wider than ¾ inch and more preferably about ½ inch or even less such as ¼ inch or ⅛ inch.

In a further embodiment the fusion may be brought about by other means such as an infrared heating device. In yet another embodiment, an ultrasonic device may be used to generate fusion temperatures along the fusion line.

While for many purposes it is convenient to provide that the fusion line is a continuous spiral along the length of the fluid treatment device, this is by no means an essential feature of the invention. It is foreseen, for example, that, along the fusion line, fused portions can be interspersed with unfused portions of equal or even greater length. While this will result in some sacrifice of overall strength of the fluid treatment device, there will be achieved an increase in the effective filtration area of the device which in many cases may be a greater benefit.

In accordance with a further aspect of the invention, the end portions 42, 43 of the wrap 26 are secured to the end caps 22, 23. The end caps 22, 23 may be fastened over the ends of the cartridge 11 and wrap assembly 12 in any suitable manner. For example, the ends of the cartridge 11 and the wrap assembly 12 may be secured to the end caps 22, 23 by positioning the ends of the cartridge 11 and the wrap assembly 12 within flanges or grooves in the end caps 22, 23. The ends of the cartridge 11 and the wrap assembly 12 may then be secured to the end caps 22, 23 by any suitable potting material, such as an epoxy adhesive. In the exemplary fluid treatment element 10, the ends of the cartridge 11 and the wrap assembly 12 may be secured to the end caps 22, 23 by fusion bonding. An annular ring portion on one side of each end cap 22, 23 is melted. The end of the cartridge 11 and the end portion 42, 43 of the wrap 26 which covers the end of the cartridge 11 may then inserted into the molten ring portion of the end cap, which is then allowed to cool. In this manner, both the cartridge 11 and the wrap assembly 12 may be fused to each other and to the end caps 22, 23.

The material from which the end caps may be made is conveniently a thermoplastic such as polypropylene, polyethylene, or a polyamide. It can, however, be a metal such as aluminum, stainless steel, or carbon steel or a ceramic or even a fiber reinforced product such as fiberglass reinforced polyester resin.

The invention is further described with reference to the following examples which are for the purposes of illustration only and are intended to imply no limitation on the essential purview of the invention.

EXAMPLE 1

This describes the spiral wrapping of a tubular filter element in which the outer layer is a microfibrous depth filter formed from polypropylene microfibers. The wrap material is a porous film of polyethylene and as this film is laid down on the filter element, heat is applied about 1/16 inch inside of the second edge of the wrap material. Heat is applied by means of a 5-inch diameter, ¼-inch thick copper wheel with a ⅛-inch radius. The wheel is coated with a non-stick oxide coating and is heated by an electrical heater bolted to one side of the wheel to a temperature of about 315° C. Electrical power is supplied to the wheel through a rotatory contactor so that the wheel, although not driven, is free to rotate. Contact of the wheel with the wrap material is maintained by a pressure cylinder which keeps a constant contact pressure between the wheel and the medium. The filter element is rotated at 50 rpm and the fusion wheel automatically advances as the wrap is applied spirally to the element.

In general, the wheel temperature is preferably adjusted to effect good fusion between the layers. Factors affecting the temperature needed are the contact pressure, the rate of rotation, (and therefore the time the part to be bonded is in the vicinity of the heat source), and the fusion temperature of the wrap. Typically, when wrapping a non-woven polyethylene at a rate of 50 rpm, a temperature of 315° C. is found to be effective. This temperature is surprisingly far above the fusion temperature of the nonwoven polyethylene, which is usually about 150° C., but is below the temperature at which decomposition of the polymer occurs. It does, however, permit high speed operations in a most efficient manner. The temperature used could be much lower but this would require a longer contact time and this would slow the production process unacceptably for some purposes. A somewhat lower temperature, such as 250° C., or even 200 C., may be used, for example, if slower production speeds can be accepted or if more effective, noncontact heating techniques are employed.

We claim:

1. An element for treating a fluid flowing through the element, the fluid treatment element comprising:
   a permeable filter medium having a hollow configuration, an external surface, and an end;
   a permeable wrap having successive overlapping windings spirally wound around and completely covering the external surface of the filter medium wherein the hoop strength of the spirally would element is sufficient to withstand inside-out flow at a pressure drop of at least 75 psid, less than 10% of the pressure drop being across the permeable wrap, each winding of the permeable wrap being positively fastened to at least one of the filter medium and a previous lapped winding; and
   an end cap secured to the end of the filter medium and the permeable wrap.

2. A fluid treatment element according to claim 1 wherein the permeable filter medium comprises a cylindrical cartridge and wherein the permeable wrap comprises a polymeric thermoplastic material having a fusion temperature below its decomposition temperature, said wrap being spirally wound about and completely covering the external surface of the cartridge and having inner and outer surfaces, first and second edge portions, and an end portion, the second edge portion of the wrap overlapping the outer surface of the wrap on the previous turn of the wrap, and the inner surface of the wrap having a section contiguous with the external surface of the cartridge, said permeable wrap being fusion bonded to at least one of the external surface of the permeable cartridge and the previous turn of the wrap.

3. A fluid treatment element according to claim 2 in which the spiral wrap is fusion bonded to the external surface of the cartridge and to itself in a continuous line in the portion adjacent the second edge of the wrap.

4. A fluid treatment element according to claim 2 in which the spiral wrap is fusion bonded to the external surface of the cartridge and to itself at spaced intervals along the portion adjacent the second edge of the wrap.

5. A fluid treatment element according to claim 2 in which the spiral wrap is formed of a polyester.

6. A fluid treatment element according to claim 2 in which the spiral wrap is formed of glass or metal fibers coated with polyvinylchloride.

7. A fluid treatment element according to claim 2 in which the spiral wrap is formed of a polymer or copolymer of an olefin.

8. A fluid treatment element according to claim 2 which further comprises a precoat demineralizer.

9. A fluid treatment element according to claim 2 wherein the end of the cartridge is fusion bonded to the end portion of the wrap.

10. A fluid treatment element according to claim 2 wherein the cartridge comprises a cylindrical nonwoven mass of polymeric microfibers substantially free of fiber-to-fiber bonding and secured to each other by mechanical entanglement of the fibers.

11. A fluid treatment element according to claim 1 wherein the permeable filter medium comprises a cylindrical mass of microfibers.

12. A fluid treatment element according to claim 11 wherein the microfibers are substantially free of fiber-to-fiber bonding and are secured by mechanical entanglement.

13. A fluid treatment element according to claim 1 wherein the filter medium comprises a cartridge including a depth filter and wherein the permeable wrap comprises a permeable polyethylene wrap having a fusion temperature below about 175° C. that is spirally wound about and completely covers the external surface of the cartridge and has inner and outer surfaces, first and second edge portions, and an end portion, the second edge portion of the wrap overlapping the outer surface of wrap on the previous turn of the wrap, and the inner surface of the wrap having a section contiguous to the external surface of the cartridge, said wrap being fusion bonded to at least one of the external surface of the cartridge and the previous turn of the wrap.

14. A fluid treatment element according to claim 1 wherein each winding is positively fastened to both the filter medium and a previous lapped winding.

15. A fluid treatment element according to claim 1 wherein the positive fastening comprises fusion bonding.

16. A fluid treatment element according to claim 1 wherein the positive fastening comprises adhesive bonding.

* * * * *

UNITED STATES PATENT AND TRADEMARK OFFICE
CERTIFICATE OF CORRECTION

PATENT NO. : 5,039,413

DATED : August 13, 1991

INVENTOR(S) : Harwood et al

It is certified that error appears in the above-identified patent and that said Letters Patent is hereby corrected as shown below:

Column 7, line 51, change "would" to --wound--.

Signed and Sealed this

Second Day of March, 1993

Attest:

STEPHEN G. KUNIN

Attesting Officer

Acting Commissioner of Patents and Trademarks